(12) United States Patent
Murao

(10) Patent No.: US 8,495,433 B2
(45) Date of Patent: Jul. 23, 2013

(54) MICROCOMPUTER MUTUAL MONITORING SYSTEM AND A MICROCOMPUTER MUTUAL MONITORING METHOD

(75) Inventor: Masaaki Murao, Seto (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 340 days.

(21) Appl. No.: 13/059,001

(22) PCT Filed: Mar. 18, 2010

(86) PCT No.: PCT/JP2010/054699
§ 371 (c)(1),
(2), (4) Date: Feb. 14, 2011

(87) PCT Pub. No.: WO2011/114493
PCT Pub. Date: Sep. 22, 2011

(65) Prior Publication Data
US 2011/0246820 A1    Oct. 6, 2011

(51) Int. Cl.
*G06F 11/00* (2006.01)
(52) U.S. Cl.
USPC ............................ 714/47.1; 714/23; 714/51
(58) Field of Classification Search
USPC ............................................ 714/23, 47.1, 51
See application file for complete search history.

(56) References Cited

U.S. PATENT DOCUMENTS

| | | | | |
|---|---|---|---|---|
| 5,367,665 A | * | 11/1994 | Koch et al. | 714/11 |
| 5,638,510 A | * | 6/1997 | Ishikawa | 714/51 |
| 5,954,407 A | * | 9/1999 | Schramm et al. | 303/155 |
| 5,961,190 A | * | 10/1999 | Brandmeier et al. | 303/152 |
| 5,964,888 A | * | 10/1999 | Kosak et al. | 714/23 |
| 6,934,893 B1 | * | 8/2005 | Pascal | 714/51 |
| 7,269,762 B2 | * | 9/2007 | Heckmann et al. | 714/47.1 |
| 2006/0224728 A1 | * | 10/2006 | Baba | 709/224 |

FOREIGN PATENT DOCUMENTS

| | | |
|---|---|---|
| JP | 60-27421 B2 | 6/1985 |
| JP | 62-9934 A | 1/1987 |
| JP | 07-64930 A | 3/1995 |
| JP | 2000-148709 A | 5/2000 |
| JP | 2001-175494 A | 6/2001 |
| JP | 2002-108835 A | 4/2002 |
| JP | 2004-310252 A | 11/2004 |
| JP | 4003420 B2 | 8/2007 |
| JP | 2008-140280 A | 6/2008 |

* cited by examiner

*Primary Examiner* — Charles Ehne
(74) *Attorney, Agent, or Firm* — Sughrue Mion, PLLC

(57) ABSTRACT

The present invention is related to a microcomputer mutual monitoring system in which mutual monitoring is performed between a first microcomputer 11 and a second microcomputer 12, characterized in that if a reset of the second microcomputer is performed due to an occurrence of an abnormal event in the second microcomputer, the monitoring of the first microcomputer is performed by an alternative monitoring function 142 incorporated in the first microcomputer instead of the monitoring of the first microcomputer by a monitoring function of the second microcomputer during the reset. With this arrangement, the microcomputer mutual monitoring system, which can prevent reduced marketability while maintaining reliability as a system, can be obtained.

4 Claims, 3 Drawing Sheets

MICROCOMPUTER MUTUAL MONITORING SYSTEM AND A MICROCOMPUTER MUTUAL MONITORING METHOD

TECHNICAL FIELD

The present invention is related to a microcomputer mutual monitoring system in which mutual monitoring is performed between a first microcomputer and a second microcomputer, a microcomputer mutual monitoring method, etc.

BACKGROUND ART

JP 07-64930 A discloses a microcomputer mutual monitoring method in a CPU backup system in which two CPUs are used as a main CPU and a backup CPU to complement each other. According to this microcomputer mutual monitoring method, if the main CPU becomes a non-operative state due to a failure of the main CPU midway through processing, the backup CPU begins to operate from the process of the task in progress.

Further, JP Patent 4003420 discloses a processing apparatus configured to reset a main microcomputer and a sub-microcomputer by stopping a run pulse signal if the sub-microcomputer cannot execute each control process of a calculation monitoring process within a corresponding processing time.

In a system including two microcomputers (referred to as a main microcomputer and a sub-microcomputer herein), they monitor mutually each other, and if one microcomputer detects an abnormal event of the other microcomputer, it resets the other microcomputer to perform an attempt to restore it.

In general, the main microcomputer is subjected to a run pulse check by a monitoring circuit other than monitoring by the sub-microcomputer, such as a run pulse check, a communication check, or an ALU calculation check; however, since a requirement is too complicated for the monitoring circuit to implement the ALU calculation check, etc., the ALU calculation check, etc., are not performed during the reset of the sub-microcomputer.

In particular, in recent years, the level of functional integration of ECUs is increasing for cost reduction, and there is a case where the reset of the sub-microcomputer is desired when control software installed in the sub-microcomputer detects an error event. At that time, even if a condition required to be met to reset the microcomputer is different for the respective installed systems, it is inevitable to reset the sub-microcomputer as a whole if any one installed system needs reset, because it is not possible to reset only a part of the sub-microcomputer due to a microcomputer configuration.

According to a configuration in which the processing of the main microcomputer continues in spite of not being capable of monitoring the main microcomputer during the reset of the sub-microcomputer, there is a problem that reliability as a system is reduced.

On the other hand, such a configuration may be contemplated in which the processing of the main microcomputer discontinues during the reset of the sub-microcomputer, considering that it is not possible to monitor the main microcomputer. However, according to such a configuration, since the main microcomputer is reset regardless of whether the main microcomputer is abnormal or normal, there is a problem that marketability is reduced.

SUMMARY OF INVENTION

Therefore, an object of the present invention is to provide a microcomputer mutual monitoring system and a microcomputer mutual monitoring method, etc., which can prevent reduced marketability while maintaining reliability as a system.

In order to solve the aforementioned problems, according to the present invention, a microcomputer mutual monitoring system in which mutual monitoring is performed between a first microcomputer and a second microcomputer is provided, in which if a reset of the second microcomputer is performed due to an occurrence of an abnormal event in the second microcomputer, the monitoring of the first microcomputer is performed by an alternative monitoring function incorporated in the first microcomputer instead of the monitoring of the first microcomputer by a monitoring function of the second microcomputer during the reset.

According to another aspect of the present invention, a microcomputer which is monitored by a second microcomputer is provided, in which said microcomputer has an alternative monitoring function incorporated therein, if a reset of the second microcomputer is performed the alternative monitoring function is configured to be notified of it, and the alternative monitoring function is configured to perform the monitoring of said microcomputer if it receives the notification.

According to yet another aspect of the present invention, a microcomputer mutual monitoring method in which mutual monitoring is performed between a first microcomputer and a second microcomputer is provided, said method comprising:

a step of detecting an abnormal event;

a set of performing a reset of the second microcomputer if the abnormal event of the second microcomputer is detected; and a step of performing monitoring of the first microcomputer by an alternative monitoring function incorporated in the first microcomputer instead of monitoring of the first microcomputer by a monitoring function of the second microcomputer during the reset step.

According to the present invention, a microcomputer mutual monitoring system and a microcomputer mutual monitoring method, which can prevent reduced marketability while maintaining reliability as a system, can be obtained.

Figure 1:
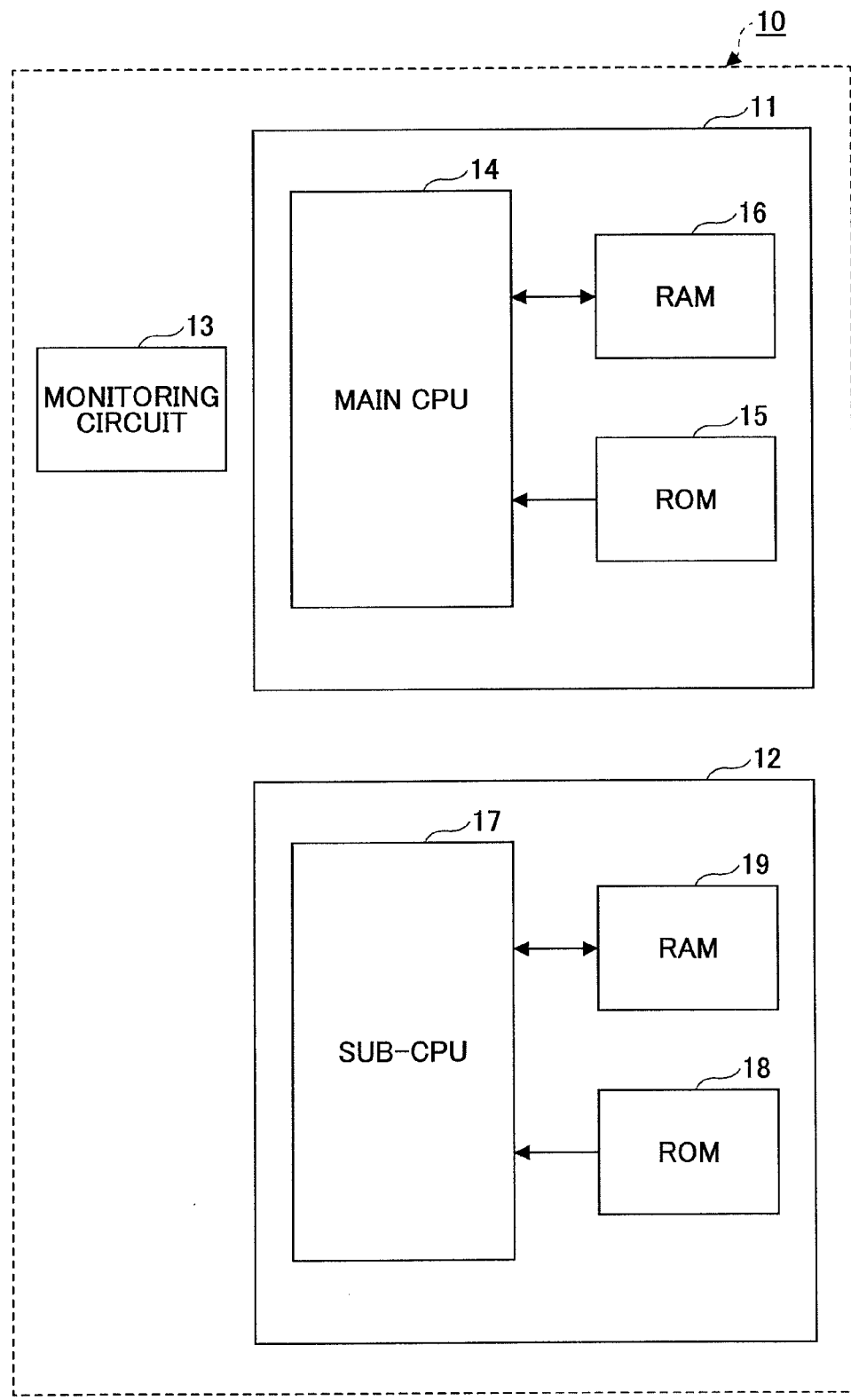
FIG. 1 is a diagram for showing a main portion of a hardware configuration of a microcomputer mutual monitoring system 10 according to an embodiment of the present invention.

EXPLANATION FOR REFERENCE NUMBERS 10 microcomputer mutual monitoring system
11 main microcomputer
12 sub-microcomputer
13 monitoring circuit
14 main CPU
14a ALU in main microcomputer
15 ROM in main microcomputer
16 RAM in main microcomputer 17 sub-CPU
18 ROM in sub-microcomputer
19 RAM in sub-microcomputer
141 ALU calculation function in main microcomputer
142 alternative monitoring function in main microcomputer
143 calculation monitoring function in main microcomputer
144 abnormal determination fail-safe function in main microcomputer
145 reset function in main microcomputer
146 additional monitoring function in main microcomputer
171 ALU calculation function in sub-microcomputer
173 calculation monitoring function in sub-microcomputer
174 abnormal determination fail-safe function in sub-microcomputer
175 reset function in sub-microcomputer
176 additional monitoring function in sub-microcomputer

BEST MODE FOR CARRYING OUT THE INVENTION

In the following, the best mode for carrying out the present invention will be described in detail by referring to the accompanying drawings.

FIG. 1 is a diagram for schematically showing a main portion of a hardware configuration of a microcomputer mutual monitoring system 10 according to an embodiment of the present invention. The microcomputer mutual monitoring system includes a main microcomputer 11, a sub-microcomputer 12 and a monitoring circuit 13. It is noted that the main microcomputer 11 and sub-microcomputer 12 may be one-chip microcomputers. The monitoring circuit 13 may be configured by an IC (a power supply IC including a watch dog timer, for example), etc.

The main microcomputer 11 is provided for performing vehicle controls and includes a main CPU 14, a ROM 15, a RAM 16, etc. The main microcomputer 11 repeatedly executes a main control routine for performing vehicle controls every predetermined process cycle (500 μs, for example) using a timer interrupt. The vehicle control may be arbitrary and may be control of a hybrid system, for example, if the vehicle is a hybrid vehicle.

The sub-microcomputer 12 is provided for monitoring whether calculation processes which the main microcomputer 11 executes in the respective control processes of the main control routine are executed normally. The sub-microcomputer 12 includes a sub-CPU 17 whose processing capability is lower than that of the main microcomputer 11, a ROM 18, a RAM 19, etc. The sub-microcomputer 12 may repeatedly execute only a calculation monitoring routine for monitoring the calculation contents of the main microcomputer 11 every predetermined process cycle (5 ms, for example) which is longer than the process cycle of the main control routine. However, the sub-microcomputer 12 may implement another function such as a vehicle control function, in addition to the monitoring function for the main microcomputer 11.

Figure 2:
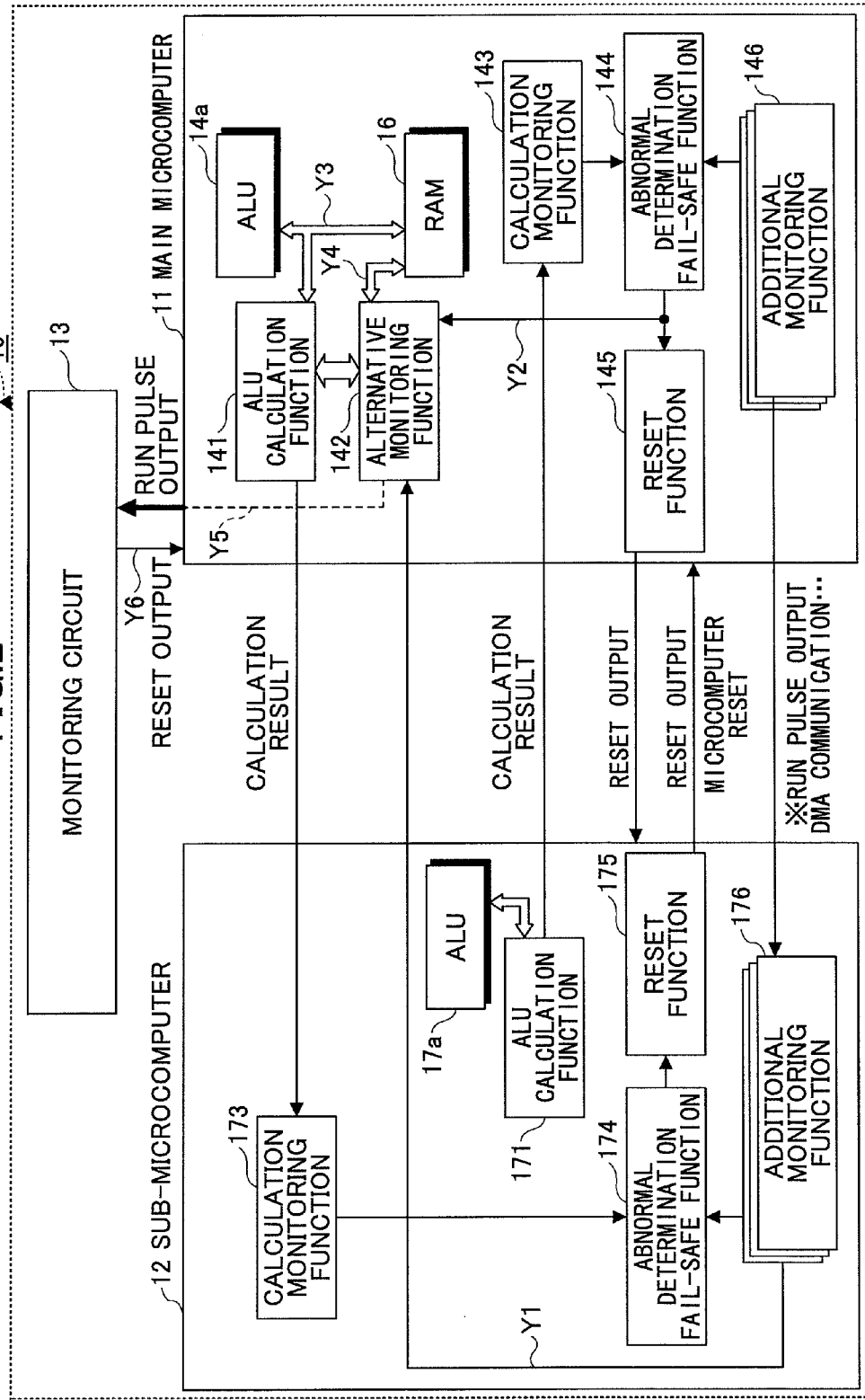
FIG. 2 is a diagram for showing a main function (a software configuration) of the microcomputer mutual monitoring system 10.

FIG. 2 is a diagram for showing a main function (a software configuration) of the microcomputer mutual monitoring system 10. In FIG. 2, primary information/signal outputs exchanged between the main microcomputer 11 and the sub-microcomputer 12, and primary signal outputs between the main microcomputer 11 and the monitoring circuit 13 are also shown.

The main microcomputer 11 includes an ALU calculation function 141, an alternative monitoring function 142, a calculation monitoring function 143, an abnormal determination fail-safe function 144, a reset function 145 and an additional monitoring function 146. These various functions may be implemented when the main CPU 14 of the main microcomputer 11 executes various pieces of software stored in the ROM 15 of the main microcomputer 11.

The sub-microcomputer 12 includes an ALU calculation function 171, a calculation monitoring function 173, an abnormal determination fail-safe function 174, a reset function 175 and an additional monitoring function 176. These various functions may be implemented when the sub CPU 17 of the sub-microcomputer 12 executes various pieces of software stored in the ROM 18 of the sub-microcomputer 12.

The microcomputer mutual monitoring system includes the following two functions as main characterizing functions.
(1) It notifies the alternative monitoring function 142 of a reset status of the sub-microcomputer 12.
(2) The alternative monitoring function 142 of the main microcomputer 11 monitors the main microcomputer 11 until the sub-microcomputer 12 is restored after the reset of the sub-microcomputer 12.

In the example shown in FIG. 2, the following concrete construction is provided for implementing the above-mentioned function (1). The additional monitoring function 176 resets the sub-microcomputer 12 itself if it detects an abnormal state of the sub-microcomputer 12. At that time, the additional monitoring function 176 supplies the alternative monitoring function 142 of the main microcomputer 11 with a notification of the reset of the sub-microcomputer 12 itself before the reset is performed (see an arrow Y1 in FIG. 2). Further, if the calculation monitoring function 143 of the main microcomputer 11, etc., detect abnormal events of the sub-microcomputer 12 (abnormal events of run pulses, communication and ALU calculations), the reset function 145 resets the sub-microcomputer 12 via the abnormal determination fail-safe function 144 of the main microcomputer 11. At that time, the abnormal determination fail-safe function 144 of the main microcomputer 11 supplies the alternative monitoring function 142 of the main microcomputer 11 with a notification that it will perform the reset of the sub-microcomputer 12 (see an arrow Y2 in FIG. 2).

In the example shown in FIG. 2, the following concrete construction is provided for implementing the above-mentioned function (2). Once the alternative monitoring function 142 of the main microcomputer 11 receives the notification of the reset from the additional monitoring function 176 of the sub-microcomputer 12 or stored information of the reset of the sub-microcomputer 12 from the software in the main microcomputer 11, the alternative monitoring function 142 implements the monitoring function of the main microcomputer 11 instead of the calculation monitoring function 173 of the sub-microcomputer 12 (which is inoperative due to the reset).

A monitoring method used in the alternative monitoring function 142 of the main microcomputer 11 may be arbitrary as long as it can appropriately detect the abnormal events of the main microcomputer (abnormal events of the ALU calculations, etc.). For example, the monitoring is implemented by reading a calculation question (a computing equation) stored in advance in the ROM 15, calculating the read calculation question with the ALU 14a of the main microcomputer 11, and comparing a calculation result thereof with a corresponding answer stored in advance in the ROM 15. The calculation question and the corresponding answer may be prepared originally for the alternative monitoring function 142 or may be shared ones prepared for monitoring the sub-microcomputer 12 (i.e., prepared for the calculation monitoring function 143). In this case, a series of several sets of the calculation question and the corresponding answer may be prepared, and the corresponding answer may be an intentionally wrong one, as disclosed in JP Patent 4003420.

In another preferred embodiment of the monitoring method used in the alternative monitoring function 142, the respective stored values of the calculation question and the answer, which are utilized previously for the monitoring of the main microcomputer 11 (i.e., the monitoring performed by the calculation monitoring function 173 of the sub-microcomputer 12), may be utilized. Specifically, while the calculation monitoring function 173 of the sub-microcomputer 12 is operating, the calculation question calculated in the main microcomputer 11 and the calculation result thereof (i.e., the calculation result transmitted to the sub-microcomputer 12) are stored in a memory (the RAM 16, for example) in such a manner that they are associated with each other (see an arrow Y3 in FIG. 2). During the reset of the sub-microcomputer 12, the calculation question stored in the memory is calculated and the calculation result thereof is compared with the associated calculation result stored in the memory (see an arrow Y4 in FIG. 2). It is noted that while the alternative monitoring function 142 of the main microcomputer 11 is functioning the calculation question and the calculation result thereof are not stored in the memory. Here, a period in which the alternative monitoring function 142 of the main microcomputer 11 is functioning corresponds to a situation where the main microcomputer 11 itself is not reset. Thus, during such a period, the calculation result of the main microcomputer 11, which is monitored by the calculation monitoring function 173 of the sub-microcomputer 12, is likely to be a correct one. In other words, because of the fact that if the calculation result of the main microcomputer 11 is abnormal the main microcomputer 11 should have been reset, the calculation result of the main microcomputer 11 in a situation where the main microcomputer 11 is not reset is likely to be the correct one. Thus, by utilizing the calculation question and the calculation result obtained when the sub-microcomputer 12 is normal, it is possible to appropriately and efficiently monitor the main microcomputer 11.

The alternative monitoring function 142 of the main microcomputer 11 compares the calculation result of the ALU 14a of the main microcomputer 11 with the corresponding answer. If the calculation result matches the corresponding answer, the alternative monitoring function 142 of the main microcomputer 11 continues to output the run pulses to the monitoring circuit 13. On the other hand, if the calculation result of the ALU 14a of the main microcomputer 11 does not match the corresponding answer, the alternative monitoring function 142 of the main microcomputer 11 stops outputting the run pulses to the monitoring circuit 13 (see an arrow Y5 in FIG. 2). In this case, the monitoring circuit 13 performs a fail-safe such as a reset of the main microcomputer 11, etc. (see an arrow Y6 in FIG. 2).

Figure 3:
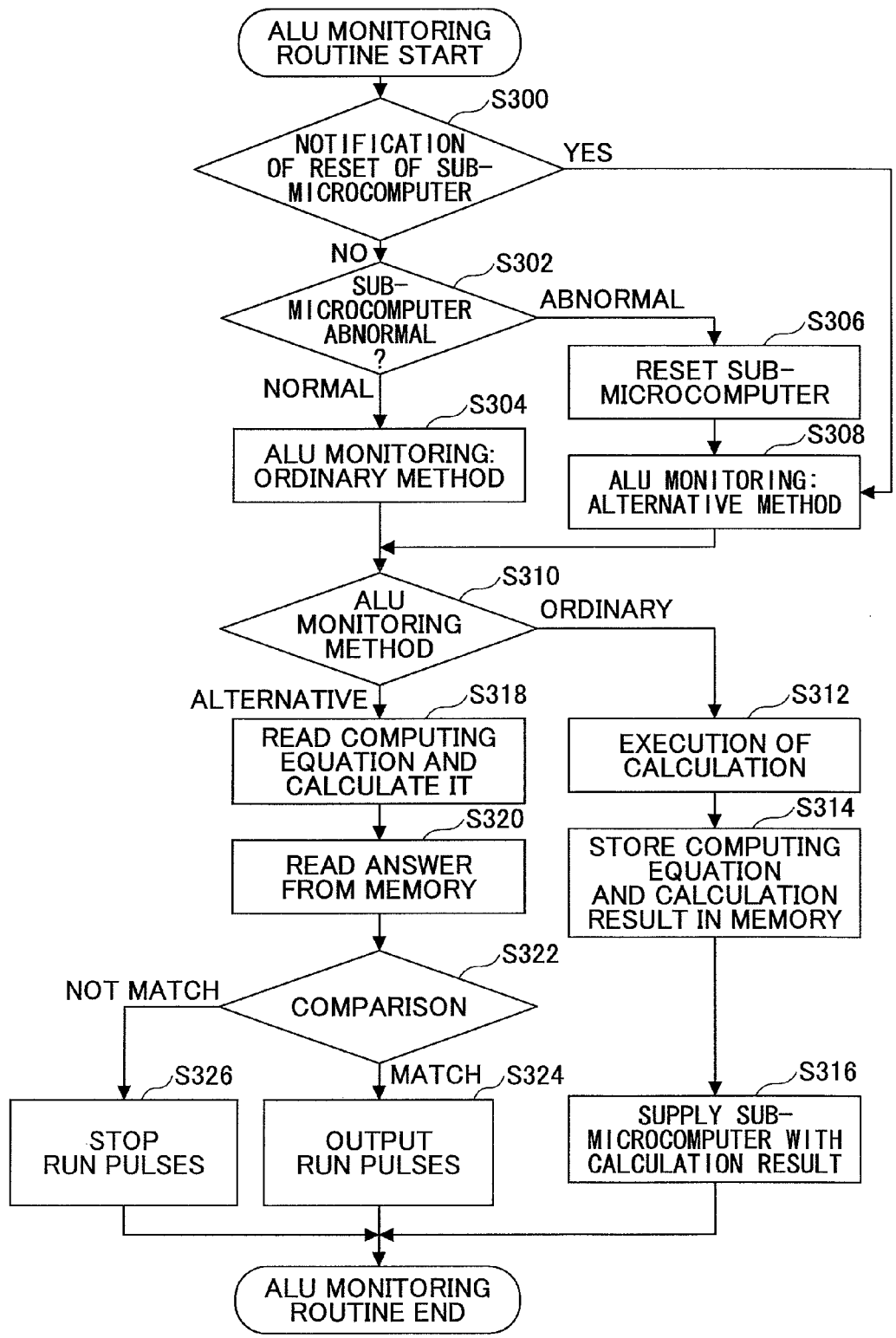
FIG. 3 is a flowchart of a microcomputer mutual monitoring method executed by the microcomputer mutual monitoring system 10 according to the present embodiment.

FIG. 3 is a flowchart of a microcomputer mutual monitoring method executed by the microcomputer mutual monitoring system 10 according to the present embodiment.

In step 300, it is determined whether the notification that reset of the sub-microcomputer 12 is to be perfomed is supplied to the alternative monitoring function 142 of the main microcomputer 11 from the additional monitoring function 176 of the sub-microcomputer 12. If there is the notification of the reset of the sub-microcomputer 12, the process routine goes to step 308. If there is not the notification of the reset of the sub-microcomputer 12, the process routine goes to step 302.

In step 302, it is determined whether the calculation monitoring function 143 of the main microcomputer 11, etc., detect an abnormal event of the sub-microcomputer 12 (an abnormal event of run pulses, communication and ALU calculations). If the abnormal event of the sub-microcomputer 12 is detected, the process routine goes to step 306. On the other hand, if the abnormal event of the sub-microcomputer 12 is not detected, the process routine goes to step 304.

In step 304, an ALU monitoring method is set to an ordinary method.

In step 306, reset of the sub-microcomputer 12 is performed.

In step 308, the ALU monitoring method is set to an alternative method.

In step 310, it is determined whether the ALU monitoring method is set to the ordinary method or the alternative method. If the ALU monitoring method is set to the ordinary method in step 304, the process routine goes to step 312. If the ALU monitoring method is set to the alternative method in step 308, the process routine goes to step 318.

In step 312, in order to prepare for the monitoring by the calculation monitoring function 173 of the sub-microcomputer 12, the ALU 14a of the main microcomputer 11 calculates a computing equation supplied from the sub-microcomputer 12. It is noted that the computing equations from the sub-microcomputer 12 are stored in advance in the ROM 18 of the sub-microcomputer 12 and are read and supplied in sequence.

In step 314, in order to prepare for the monitoring which may be performed by the alternative monitoring function 142 in the future, the computing equation obtained in step 312 and the calculation result thereof are associated with each other and stored in the memory (for example, the RAM 16) of the main microcomputer 11. This memorization of a pair of the computing equation and the calculation result may be performed with a FIFO method so as to always maintain the newest predetermined number of pairs, or may be stopped after the predetermined number of pairs has been stored. It is noted that the computing equation and the calculation result stored in the memory of the main microcomputer 11 are deleted (cleared) correspondingly if the main microcomputer 11 is reset.

In step 316, the calculation result obtained in step 312 is supplied to the sub-microcomputer 12. It is noted that when the calculation result is supplied, the calculation monitoring function 173 of the sub-microcomputer 12 compares the calculation result supplied this time with an answer which corresponds to the computing equation supplied in step 312. If they match, it is determined that the main microcomputer 11 is normal, and thus the fail-safe such as reset, etc., is not performed. On the other hand, if the calculation result of the ALU 14a of the main microcomputer 11 does not match the corresponding answer, the reset function 175 resets the main microcomputer 11 via the abnormal determination fail-safe function 174 of the sub-microcomputer 12.

In step 318, the ALU 14a of the main microcomputer 11 reads the computing equation stored in the memory (see step 314), and calculates the read computing equation.

In step 320, the alternative monitoring function 142 of the main microcomputer 11 reads the answer (the past calculation result, see step 314) corresponding to the computing equation read in step 318.

In step 322, the alternative monitoring function 142 of the main microcomputer 11 compares the calculation result obtained in step 318 with the answer read in step 320. As a result of the comparison, if the calculation result obtained in step 318 matches the answer read in step 320, the process routine goes to step 324. If the calculation result obtained in step 318 does not match the answer read in step 320, the process routine goes to step 326.

In step 324, the alternative monitoring function 142 of the main microcomputer 11 continues to output the run pulses to the monitoring circuit 13.

In step 326, the alternative monitoring function 142 of the main microcomputer 11 stops outputting the run pulses to the monitoring circuit 13. In this case, the monitoring circuit 13 performs the fail-safe by resetting the main microcomputer 11, etc.

According to the present embodiment described above, the following effect among others can be obtained.

Even during the reset of the sub-microcomputer 12, the main microcomputer 11 can implement substantially the same ALU abnormality check by itself. Thus, it is possible to ensure reliability and safety of a system without stopping the processing of the main microcomputer 11 even during the reset of the sub-microcomputer 12.

Further, the alternative monitoring function 142 of the main microcomputer 11 and other functions related therewith can be implemented with only software without requiring external specific hardware circuits, ICs, etc.

Further, by utilizing the respective stored values of the calculation question and the calculation result obtained when the sub-microcomputer 12 is normal and can monitor the main microcomputer 11 appropriately, it becomes possible to ensure reliability necessary for monitoring itself in the main microcomputer 11 in an efficient manner.

The present invention is disclosed with reference to the preferred embodiments. However, it should be understood that the present invention is not limited to the above-described embodiments, and variations and modifications may be made without departing from the scope of the present invention.

For example, in the above-described embodiments the alternative monitoring function 142 and functions related therewith are installed in the main microcomputer 11. However, in addition to it or instead of it, a similar alternative monitoring function and functions related therewith may be installed in the sub-microcomputer 12. In other words, the sub-microcomputer 12 may have an alternative monitoring function for monitoring the sub-microcomputer 12 itself, instead of the calculation monitoring function 143 of the main microcomputer 11, during the reset of the main microcomputer 11. Such a configuration is suited for a case where the sub-microcomputer 12 has a control function (a vehicle control function, etc.) in addition to the monitoring function for the main microcomputer 11. This is because even during reset of the main microcomputer 11 it becomes possible to ensure reliability and safety of a system without stopping the control function.

Further, the above-described embodiments are related to the mutual monitoring system between the main microcomputer 11 and the sub-microcomputer 12; however, an extended mutual monitoring system between more than three microcomputers can be applicable.

Further, the above-described embodiments are related to the mutual monitoring system between the main microcomputer 11 and the sub-microcomputer 12; however, a mutual monitoring system between two CPU cores can be applicable in a similar manner. In other words, the mutual monitoring system between two CPU cores in a multi-core microcomputer can be applicable in a similar manner.

The invention claimed is:

1. A microcomputer mutual monitoring system in which mutual monitoring is performed between a first microcomputer and a second microcomputer, wherein
   if a reset of the second microcomputer is performed due to an occurrence of an abnormal event in the second microcomputer, the monitoring of the first microcomputer is performed by an alternative monitoring function incorporated in the first microcomputer instead of the monitoring of the first microcomputer by a monitoring function of the second microcomputer during the reset,
   a computing equation calculated by the first microcomputer for the purpose of the monitoring of the first microcomputer by the second microcomputer before the reset of the second microcomputer and a calculation result thereof are stored as stored data in the first microcomputer, and
   the alternative monitoring function implements the monitoring of the first microcomputer during the reset of the second microcomputer by comparing a calculation result obtained when the first microcomputer recalculates the computing equation in the stored data with the corresponding calculation result in the stored data during the reset of the second microcomputer.

2. The microcomputer mutual monitoring system as claimed in claim 1, wherein said microcomputer mutual monitoring system includes a monitoring circuit connected to the first microcomputer, and
   if the abnormal event in the first microcomputer is detected, the reset of the first microcomputer is performed by the monitoring circuit.

3. A microcomputer which is monitored by a second microcomputer, wherein
   said microcomputer has an alternative monitoring function incorporated therein,
   a computing equation calculated by the microcomputer for the purpose of the monitoring of the microcomputer by the second microcomputer before the reset of the second microcomputer and a calculation result thereof are stored as stored data in the microcomputer,
   if a reset of the second microcomputer is performed the alternative monitoring function is configured to be notified of it, and
   the alternative monitoring function is configured to perform the monitoring of said microcomputer by comparing a calculation result obtained when the microcomputer recalculates the computing equation in the stored data with the corresponding calculation result in the stored data during the reset of the second microcomputer, if it receives the notification.

4. A microcomputer mutual monitoring method in which mutual monitoring is performed between a first microcomputer and a second microcomputer, comprising:
   a storing step of storing as stored data in the first microcomputer a computing equation calculated by the first microcomputer for the purpose of the monitoring of the first microcomputer by the second microcomputer before the reset of the second microcomputer and a calculation result thereof;
   a step of detecting an abnormal event;
   a reset step of performing a reset of the second microcomputer if the abnormal event of the second microcomputer is detected; and
   a step of performing monitoring of the first microcomputer by an alternative monitoring function incorporated in the first microcomputer instead of monitoring of the first microcomputer by a monitoring function of the second microcomputer during the reset step, wherein the alternative monitoring function implements the monitoring of the first microcomputer during the reset of the second microcomputer by comparing a calculation result obtained when the first microcomputer recalculates the computing equation in the stored data obtained in the storing step with the corresponding calculation result in the stored data during the reset of the second microcomputer.

* * * * *